UNITED STATES PATENT OFFICE.

HENRY ALBERT HUGHES, OF PHILADELPHIA, PENNSYLVANIA.

PROCESS OF TREATING GLUCOSE.

No. 916,558.     Specification of Letters Patent.     Patented March 30, 1909.

Application filed March 20, 1905. Serial No. 251,144.

*To all whom it may concern:*

Be it known that I, HENRY ALBERT HUGHES, a citizen of the United States, residing in Philadelphia, Pennsylvania, have invented certain Improvements in the Process of Treating Glucose, of which the following is a specification.

My invention relates to the treatment of glucose and other saccharine solutions for the purpose of counteracting or eliminating the objectionable and disagreeable taste of the same, caused by the presence of sulfites or acid residues remaining in said liquids after their manufacture, and which may be incident to their manufacture or added for any special purpose. The chemicals noted and their resultant flavors are usually present in commercial glucose and other saccharine solutions, being the residue of ingredients employed in the process of manufacturing said liquids, as well as material added to prevent spoiling of the liquids, and they greatly modify the flavor and commercial value of the same.

My invention consists in changing or converting the indigestible sulfites, or sulfurous acid, existing in commercial glucose and other saccharine solutions, and the eliminating or counteracting of these and other existing, indigestible compounds; resulting in the glucose assuming a honey-like flavor, equaling the finest sugar syrup.

My invention consists in treating saccharine solutions, particularly commercial glucose, (made by subjecting starch to the action of an acid, and which contains sulfites or sulfurous acid in solution,) with an aldehyde of one of the primary alcohols. Among the preferred aldehydes, may be mentioned methyl-aldehyde, or an aldehyde in its polymerized state may be employed. I have discovered that the objectionable flavor or taste of glucose and other saccharine solutions caused by the presence of sulfites or sulfurous acid, remaining in the glucose and saccharine solutions or added after manufacture, may be eliminated or counteracted by the use of one of the aldehydes of the primary alcohols, whether in a polymerized state or not.

The sulfites when present in saccharine liquids may be eliminated by formaldehyde in any one of the three following forms: 1st: by adding the pure gas to said saccharine solution containing sulfites. 2nd: by adding a 40% solution of formaldehyde gas in water. (The "formalin" of commerce.) 3rd: by addition of formaldehyde in a polymerized state, generally called "paraformaldehyde".

By treating saccharine solutions, such as glucose, grape sugar, cane sugar, cane syrup, molasses or invert sugar, containing sulfites or sulfurous acid residues in solution, with an aldehyde, methyl-aldehyde, or paraformaldehyde, a chemical compound of said sulfites and residues and the aldehyde is produced, which frees said saccharine solutions from the acrid, disagreeable taste occasioned by the presence of said sulfites or acid residues in solution. The compound formed by the combination of the aldehyde and the sulfites or sulfurous acid, has marked chemical and physical properties, differing from those of the chemicals from which they are formed; to wit, as follows:

1. The taste and smell of these several ingredients or elements, inherent or added, undergoes a complete change. The acrid taste and pungent smell of the chemicals is removed, leaving a slightly sour taste (not of a disagreeable nature), with little or no smell; the taste of the new compound being nearly that of water.

2. The preservative qualities of the aldehyde, sulfurous acid &c., are very strong, but those of this new compound are weakened, showing that the usual properties of the aldehyde have undergone a complete change.

3. The bleaching power of the sulfites or sulfurous acid is completely destroyed.

4. The tissue-hardening power of the aldehyde is also destroyed.

5. The new compound, substantially a salt of sulfurous acid and aldehyde, is decomposed at 100° C., and readily volatilizes; a condition which may also be effected at normal temperature by a treatment with a mineral acid of higher affinity.

In other words I have discovered that by adding a proper quantity of an aldehyde to glucose and saccharine solutions containing sulfites and sulfurous acid residues, such quantity to be determined by the quantity of sulfites or acid residues present in the saccharine solutions; that an innocuous compound has been formed which does not possess the disagreeable odor and flavor or taste of said sulfites and acid residues, or of the aldehyde, or the characteristic tissue-hardening properties of said aldehyde.

In practicing the improved method or process forming the subject of my invention, the glucose or other saccharine solution may be thinned by the addition of water until its body is of substantially the same density as ordinary commercial sugar, syrup or molasses, or I may treat the ordinary commercial glucose which is usually thin enough, without any special preparation. In the cases of other saccharine solutions or materials of greater density, they should be thinned by the addition of water to the same consistency.

To one barrel of glucose or other saccharine liquid containing 55 gallons (650 lbs.) of raw material, I add from 1¼ to 6 ozs. of methyl-aldehyde, ($CH_2O$). These proportions are equally available for use with thin bodied syrups and other saccharine solutions. The quantity of methyl-aldehyde used is based upon the pure gas of 100 per cent. strength, or I may use the formalin of commerce comprising a 40 per cent. solution of methyl-aldehyde in water, the quantity to be added being increased in proper ratio, or I may use paraformaldehyde. In combining the aldehyde above noted with the glucose or other saccharine solution, I first determine the amount of sulfites or acid residues to be counteracted, and then add the aldehyde accordingly, taking care not to use any excess of aldehyde above the combining equivalent. Theoretically 30 parts of $CH_2O$ combine with 64 parts of $SO_2$ according to their atomic weights, or 31.91 parts of $CH_2O$ to 68.09 parts of $SO_2$ in every one hundred parts of the compound of the two. That this simple combination takes place has been proven by tests in which 50 grms., of 4.77% strength sulfur-di-oxid gas in solution in water, and 2.8056 grms., 40% strength—methyl-aldehyde gas in solution in water were combined, eliminating the characteristic taste and smell of each and forming a compound having different chemical characteristics from the original substances from which it was formed. 50 grms., of sulfur-di-oxid gas of 4.77% strength equals 2.3850 grms., pure sulfur-di-oxid gas, or 68 parts, which combines with 1.12224 grms. pure methyl-aldehyde gas equaling 40% of 2.8056 grms., of pure methyl-aldehyde, (being 40% solution) or 32 parts, making a total of 100 parts. Again, in the case of solutions of bi-sulfite of lime; treatment with 40% methyl-aldehyde gas solution, eliminated the taste and smell of both of these chemical substances, and formed a compound having different chemical properties. 50 grms., of bi-sulfite of lime solution required 1.8280 grms., pure methyl-aldehyde gas to eliminate taste and smell of both, or 4.57 grms., 40% solution. In this case the methyl-aldehyde seems to combine with the bi-sulfite of lime according to the amount of $SO_2$ present. As methyl-aldehyde eliminates the taste and smell of both sulfurous acid or sulfites in solution, as well as its own taste and smell, the best method for determining the amount necessary to eliminate the taste and smell of sulfurous acid or sulfites in solution in syrups, molasses, etc., is to add the aldehyde to said solution until said taste is eliminated. Any excess of aldehyde causes a bitter or "burnt" taste, or the characteristic pungent taste of the aldehyde, and as shown in practice, any less than an amount sufficient to effect the proper combination, leaves the characteristic "sulfur" taste in the solution. Also, any sulfites or sulfurous acid present will act as a bleach if a small amount of syrup containing it be poured into a solution containing vegetable coloring matters, but if completely combined with methyl-aldehyde, the effect will be to darken the color rather than to bleach.

To determine the quantity of the aldehyde necessary to combine with the acid residue in syrups, molasses, etc., and to determine amount of acid residue present, the following simple process may be carried out: Draw a sample of syrup, molasses, or other saccharine solution containing the disagreeable taste and flavors of sulfites or sulfurous acid, weigh off a certain amount say 1 lb.; and then add the aldehyde in the desired form until the "sulfur" flavor is eliminated. In lieu of this treatment, the bleach test for finer work can be tried as mentioned above. For every 30 parts of pure methyl-aldehyde $CH_2O$, 64 parts $SO_2$ exist in the saccharine solutions so treated. Having obtained this, the amount necessary to eliminate the "sulfur" taste in a larger quantity can be found by simple multiplication by the factor of relative proportion.

The treatment of the glucose or other saccharine liquids or solutions, according to the method herein described, should be carried on at a temperature of about 130° F. If a higher degree of heat be used, a quicker and more violent action takes place, permitting less weight of chemicals to be used, but this gain in the saving of material requires constant attention, and if the heat be slightly raised or exerted for a very short time longer than is necessary to produce the desired change of flavor, the discoloring of the glucose will be rapid and the slight gain in cost by the saving of chemicals will be offset and lost by errors in manufacture.

In the claims, I speak of "saccharine solutions", and this term is meant to include glucose, grape sugar, invert sugar, cane sugar, cane syrup and molasses, and mixtures of any two or more of these saccharine compounds.

I claim—

1. The process of treating saccharine solutions for the purpose of counteracting or eliminating the effect of sulfites and sulfurous acid residues present therein, which consists in determining the quantity of sulfites and acid residues in such solutions, and then adding thereto an aldehyde of one of the primary alcohols sufficient in quantity to combine with said sulfites and acid residues and form a different and innocuous compound.

2. The process of treating saccharine solutions for the purpose of counteracting or eliminating the effect of sulfites and sulfurous acid residues present therein, which consists in determining the quantity of sulfites and acid residues present in such solutions, and then adding thereto methyl-aldehyde sufficient in quantity to combine with said sulfites and acid residues and form a different and innocuous compound.

3. The process of treating saccharine solutions for the purpose of counteracting or eliminating the effect of sulfites and sulfurous acid residues present therein, which consists in determining the quantity of sulfites and acid residues in such solutions, heating the same, and then adding thereto an aldehyde of one of the primary alcohols sufficient in quantity to combine with said sulfites and acid residues and form a different and innocuous compound.

4. The process of treating saccharine solutions for the purpose of counteracting or eliminating the effect of sulfites and sulfurous acid residues present therein, which consists in determining the quantity of sulfites and acid residues present in such solutions, heating the same, and then adding thereto methyl-aldehyde sufficient in quantity to combine with said sulfites and acid residues and form a different and innocuous compound.

5. The process of treating commercial glucose for the purpose of counteracting or eliminating the effect of sulfites and sulfurous acid residues present therein, which consists in determining the quantity of sulfites and acid residues in such glucose, and then adding thereto an aldehyde of one of the primary alcohols sufficient in quantity to combine with said sulfites and acid residues and form a different and innocuous compound.

6. The process of treating commercial glucose for the purpose of counteracting or eliminating the effect of sulfites and sulfurous acid residues therein, which consists in determining the quantity of sulfites and acid residues in such glucose, and then adding thereto methyl-aldehyde sufficient in quantity to combine said sulfites and acid residues and form a different and innocuous compound.

7. The process of treating commercial glucose for the purpose of counteracting or eliminating the effect of sulfites and sulfurous acid residues present therein, which consists in determining the quantity of sulfites and acid residues in such glucose, then heating the same, and then adding thereto an aldehyde of one of the primary alcohols sufficient in quantity to combine with said sulfites and acid residues and form a different and innocuous compound.

8. The process of treating commercial glucose for the purpose of counteracting or eliminating the effect of sulfites and sulfurous acid residues therein, which consists in determining the quantity of sulfites and acid residues in such glucose, then heating the same, and then adding thereto methyl-aldehyde sufficient in quantity to combine said sulfites and acid residues and form a different and innocuous compound.

In testimony whereof, I have signed my name to this specification, in the presence of two subscribing witnesses.

HENRY ALBERT HUGHES.

Witnesses:
 MURRAY C. BOYER,
 JOS. H. KLEIN.